United States Patent
Alfredsson et al.

(10) Patent No.: US 6,774,818 B1
(45) Date of Patent: Aug. 10, 2004

(54) METHOD AND DEVICE FOR THE PRESENTATION OF OBJECTS IN SURROUNDING SPACE

(75) Inventors: Jens Alfredsson, Linköping (SE); Fredrik Romare, Linköping (SE)

(73) Assignee: SAAB AB, Linkoping (SE)

(*) Notice: Subject to any disclaimer, the term of this patent is extended or adjusted under 35 U.S.C. 154(b) by 0 days.

(21) Appl. No.: 10/110,240
(22) PCT Filed: Oct. 10, 2000
(86) PCT No.: PCT/SE00/01964
§ 371 (c)(1), (2), (4) Date: Apr. 10, 2002
(87) PCT Pub. No.: WO01/27652
PCT Pub. Date: Apr. 19, 2001

(30) Foreign Application Priority Data

Oct. 12, 1999 (SE) ............................................... 9903650

(51) Int. Cl.[7] .......................... G01C 21/00; G01C 23/00
(52) U.S. Cl. ...................... 340/971; 340/974; 342/180
(58) Field of Search ............................... 340/971, 974; 367/113, 120; 342/176, 179, 180

(56) References Cited

U.S. PATENT DOCUMENTS

| | | |
|---|---|---|
| 3,200,398 A | 8/1965 | Witt |
| 3,602,877 A | 8/1971 | Currie et al. |
| 4,940,987 A * | 7/1990 | Frederick ..................... 342/26 |
| 5,181,028 A | 1/1993 | Sharpe et al. |
| 5,341,141 A * | 8/1994 | Frazier et al. ................ 342/59 |
| 6,198,428 B1 * | 3/2001 | Sekine ....................... 342/176 |

FOREIGN PATENT DOCUMENTS

EP 0226841 11/1986

* cited by examiner

Primary Examiner—John Tweel
(74) Attorney, Agent, or Firm—Swidler Berlin Shereff Friedman, LLP

(57) ABSTRACT

The invention relates to a method device for displaying, in a way that is easy for an operator, such as a pilot in an aircraft, to grasp and understand, the direction to objects (A, B) in the surrounding space. In accordance with the invention the object is projected onto a projection surface (3) comprised of the envelope surface of a conical solid of revolution, where the operator is somewhere vertically (h) on the axis of rotation (2) about which the envelope surface (3) is created. Thereafter, the operator observes, on a display surface (I) such as a viewing screen, a plan view from above of the conical envelope surface, where the horizontal direction (c, d) to the objects, and each object's height (a, b) compared to one's own height (h), represented by a circular curve (6), are easily read.

17 Claims, 3 Drawing Sheets

US 6,774,818 B1

METHOD AND DEVICE FOR THE PRESENTATION OF OBJECTS IN SURROUNDING SPACE

TECHNICAL FIELD

The invention relates to a method and device for presenting information, in a way that is easy for an operator, such as a pilot in an aircraft, to grasp and understand, concerning the direction to objects in the surrounding space. In accordance with the invention, the object is projected onto a surface comprised of the envelope surface of a conical solid of revolution, where the operator is somewhere vertically on the axis of rotation about which the envelope surface is created. Thereafter, the operator observes, on a display surface such as a viewing screen, a plan view from above of the conical envelope surface, where the horizontal direction to the objects, and the each object's relative height are easily read.

STATE OF THE ART

It is a known fact that it is difficult to create a three dimensional image on a flat screen. It is, however, often necessary to provide an operator, a pilot in a plane for example, with information about what is happening in the surrounding air space. There are a number of solutions that use a flat screen to inform the operator about occurrences in the surroundings. A known example is a so-called PPI, which with the help of radar shows, on a flat screen, the distance and direction to a craft In this case, no information on the craft's vertical position is provided, important information for an observer in an aircraft Another example is the case in which a pilot in a fighter aircraft receives information, through its own radar or other target seeker, on bearings and angle of altitude to foreign craft, whereby the craft is imaged as a point on a flat screen. The screen has both a horizontal and a vertical axes, whereby the position of the point to the right of the vertical axis gives the bearing of the craft to the right by up to 180°, while the position of the point to the left of the vertical axis corresponds to the bearing of the craft to the left by up to 180°. The position on the screen of these points along the vertical axis corresponds to the altitude of the craft, since the vertical axis represents a scale of altitude.

Commonly used nowadays, such a display on a screen may be difficult for a pilot to interpret A pilot, particularly the pilot in a fighter aircraft, has a range of instruments in his field of view, which means that in stressful situations interpretation of the instrument information on the displays must be easily accessible and easily convertible to one's own conception of the world and of space.

The document U.S. Pat. No. 5,181,028 gives an example of a display for communicating information to a pilot on the position of nearby aircraft on a flat screen, where these are represented on a spherical grid transformed to a plane projection. However, it is complicated to use, as application requires the use of means to stereoscopically read the display.

DESCRIPTION OF INVENTION

One aspect of the invention is shown by the independent claims for the method and the device. In accordance with this aspect, it is shown how one technically creates an image of surrounding space and the direction to objects in space for display on a plane display surface, for example a viewing screen. The image of the surroundings is obtained by creating, about a reference position—normally one's own position, an imaginary projection surface in the form of a surface of revolution with a vertical axis of rotation, where the cross-section of the surface of revolution increases in the direction from one end of the axis of rotation to the other end. The height of the projection surface is arbitrary. In this description, the term cone is used to describe the surface of revolution, since the surface of revolution can be either jutting inwards or outwards. The reference position in space is on the axis of rotation, so that a horizontal plane through the reference position defines a circular curve on the projection surface, which shows the height of the reference position. The height of the reference position refers here to the height of the reference position in the body encompassed by the projection surface. On measuring an object for which one wants the direction shown on the projection surface, the position is determined for the point where a line of collimation from the reference position through the object intersects the projection surface.

It is now technically possible to image the direction to the object on the projection surface, i.e. normally an instrument window, by showing a plan view of the defined projection surface, which, for example, can be embodied by the aforementioned cone, across its axis of rotation. The display surface shows a largest circle that denotes the largest cross-section of the projection surface, and a circle that represents the height of the reference position projected on the projection surface. One's own position is represented by the center of the circle, where the axis of rotation of the projection surface is located. This mid-point may be indicated by some kind of graphic symbol. From one's own position, a reference direction, i.e. a zero direction, is defined on the circle defining the horizontal plane of the reference position.

Recording the object involves obtaining a direction to it, whereby by means of calculations, the position of the image of the object on the projection surface is determined, and is entered as a point on the plane image of the projection surface on the display surface. It follows that the said point, which is positioned on the line of collimation to the object, will represent the direction to the object as seen from the reference point. If the cone is positioned so that its base is oriented upwards and the point lies outside the horizontal circle representing the reference height, then the object is positioned higher than the reference position, i.e. the angle of altitude to the object is positive. If the point in this case is below the horizontal circle, then the object is positioned lower than the reference height, i.e the angle of altitude to the object is negative. Moreover, the angle with the apex at the mid-point from the reference direction to the line of collimation to the object represents the bearing of the object relative to the reference position. It is preferable for the bearing to be counted from the reference direction, 180° to the right and 180° to the left, thereby being intuitively in accord with one's conception of space. For example, an object on an instrument window that is imaged as a point lying on the horizontal circle and 180° to the right or left is, therefore, positioned in a direction that is directly behind and at the same height as the aircraft's own position in the case where the reference direction signifies "straight ahead".

The reference height, i.e. the height of the circular curve displayed on the projection surface representing the horizontal plane of the reference position, may be either movable or fixed vertically on the projection surface. These versions illustrate two different applications of the technique. In the case where the reference height is fixed on the projection surface and the technique is used for a flying craft represented by the reference position, the projection surface follows the aircraft is fixed to it. In the other case, when the reference height is movable, the horizontal circle will move vertically on the projection surface in conjunction with any variation in the altitude of the aircraft. In the latter alternative, the circular curve, which shows the horizontal plane of the reference position on the projection surface, will rise as the aircraft ascends from lower to higher altitudes.

The described method and device can be used with advantage in aircraft to provide the operator, a pilot in this case, with an easily comprehensible orientation of the direction to the object, such as foreign craft in the surroundings, viewed from one's own position, which in this case is the reference position. The pilot can obtain, in a way that is easy to grasp, angle information on these craft. This is a great advantage, since in this case a pilot has access to instrument systems in the aircraft that are based on angle measurements, such as different sensor systems, for example radar, IR sensors, and interception receivers. If the pilot is to perform a cognitive or motor action, where the action involves an angle-related maneuver, it is much easier if the action is supported by the method in accordance with the invention, since it only displays angles on the instrument window.

In accordance with the invention, the method and device can with advantage be used within any field where the relationships between object, occurrences and other phenomena can be described in accordance with the aspect of the invention, such as in military and civil aircraft, Air Force Headquarters, simulators, operational control, process control, and surveillance systems.

DESCRIPTION OF EMBODIMENTS

A number of embodiments of the invention are described below with the aid of the drawings.

Figure 1:
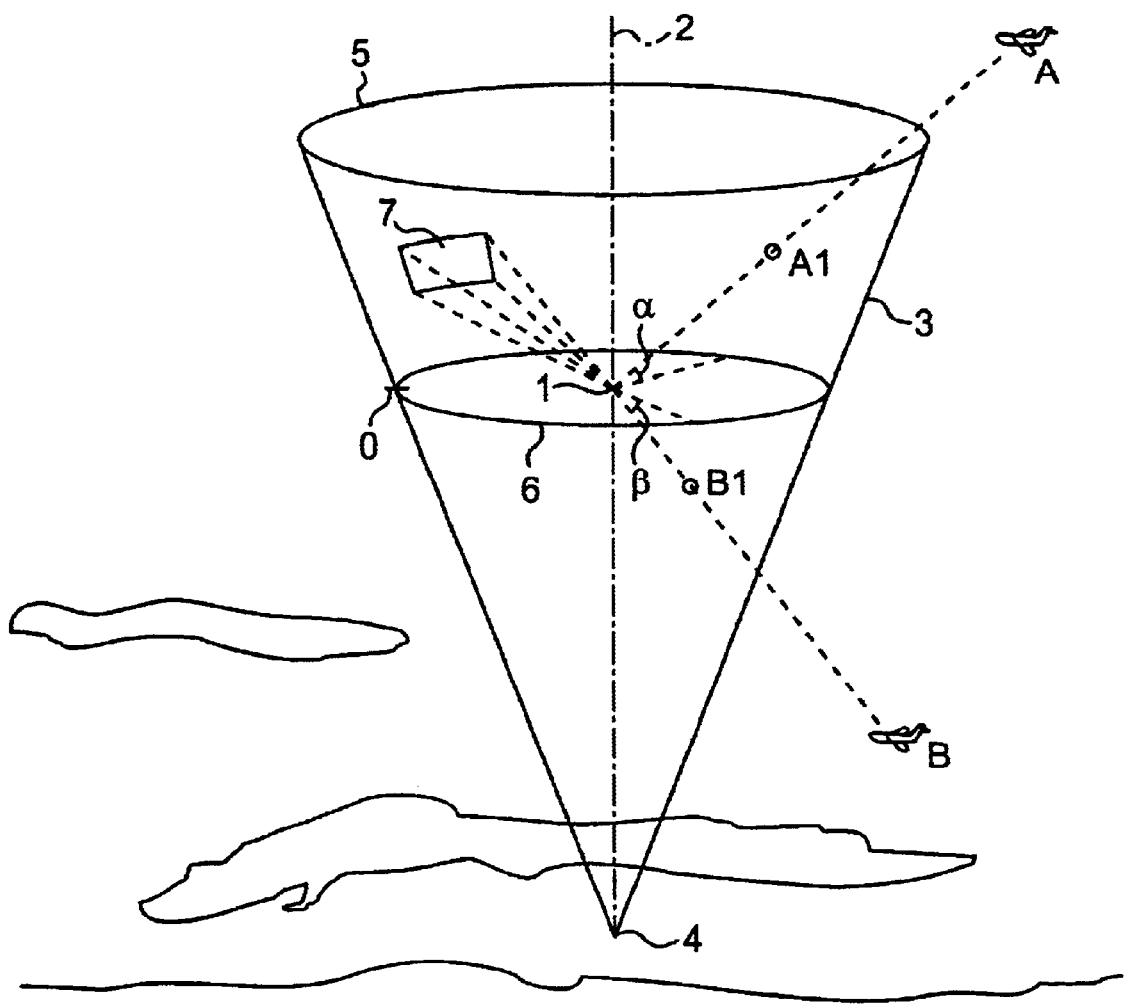
FIG. 1 shows in a perspective view how different targets can be recorded from, for example, an aircraft, and how these targets can be represented by points on a conical projection surface.

In accordance with an embodiment of the invention, the aspect of the invention is used to utilize instruments in an aircraft to record objects in surrounding space by reading the direction to the target, and by converting the measured values of the angle recording to the target to a projection of the direction to the target as a point on a projection surface 3. FIG. 1 shows from one perspective a reference position 1 in the form of an aircraft positioned somewhere vertically on the axis of rotation 2 of an envelope surface shaped like a cone and representing the projection surface 3. The cone's dimensions are predetermined. For instance, the height of the cone's apex can be entered as zero; in other words, it is assigned to ground level. The height of the cone is arbitrary. When used in an aircraft, the height of the cone may be several thousand meters. It is also convenient to be able to switch between a number of fixed projection surfaces of different heights, i.e. in this case cones of different fixed heights. The width of the cone opening, i.e. its greatest circular cross-section, may be freely chosen. The size of the angle of altitude v of the cone, which we have defined as the angle at the periphery of the circle between a radius in the said greatest circular cross-section and the apex of the cone, is arbitrary. Ground level, in this case sea level, is shown in the drawing with the land area indicated as symbols. The circular curve 5 around the largest cross-section indicates the largest angle of altitude that can be displayed on the projection surface from one's own position, which here is the reference position 1. Another circular curve 6 represents the intersection of the horizontal plane through one's own position and the projection surface. On the circular curve 6, a point 0 indicates the direction forward from one's own position, in this case straight-ahead from one's own aircraft. This point 0 is the reference direction and is used as the basis for stating the azimuth, i.e. the bearing, to the target being measured, which implies that the bearing of point 0 is zero.

Two objects, in this case flying craft A and B, are drawn as targets in FIG. 1. The flying object A is diagonally behind and to the right of one's own aircraft and at a greater altitude, i.e. with a positive angle of altitude $\alpha$ relative to one's own aircraft The azimuth c (see FIG. 2) to the target A, i.e. the bearing to A, is in the example measured as 140° to the right, measured from the forward direction. The line of collimation from one's own position at 1 to the target A intersects the projection surface 3, i.e. the cone, at point A1.

The flying object B is diagonally behind and to the left of one's own aircraft and at a lower altitude, i e. with a negative angle of altitude $\beta$ relative to one's own aircraft. The azimuth d to the target B, i.e. the bearing to B, is in the example measured as 120° to the left, measured from the forward direction. The line of collimation from one's own position at 1 to the target B intersects the projection surface 3, i.e. the cone, at point B1.

FIG. 1 also shows the range of deflection that a sensor present in one's own plane is able to span in space. This range of deflection is represented by 7 in the drawing. Such a sensor may be embodied by, for example, an IR-sensor, which a pilot in the aircraft can maneuver both vertically and sideways. In the example, the sensor is set for scanning of an area diagonally in front of and to the right of one's own position and, in addition, at a higher altitude. In the example the sensor area 7 is exemplified as spanning an angle of altitude between $\gamma$ and $\delta$ and laterally from bearing $c_1$ to $c_2$ to the right.

Figure 2:
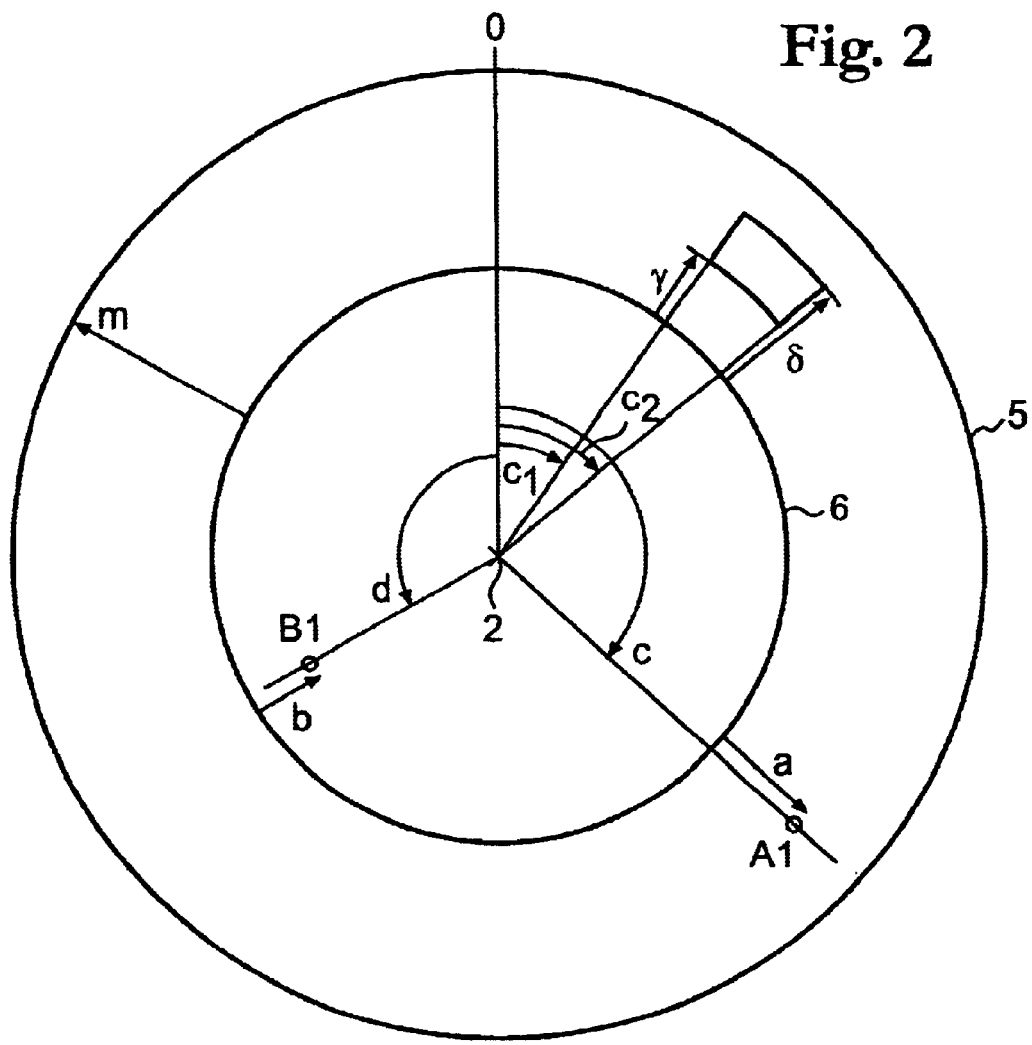
FIG. 2 shows a plan view of the projection surface as in FIG. 1 and representation of the targets on an instrument window, where the reference position is represented by the mid-point, the outer circle the largest measurable angle of altitude to a target, and the inner circle the horizontal plane through the reference position.

The direction to the measured targets A and B, and the position of the sensor area 7 are displayed on a display surface I, which may be embodied by a viewing screen (of CRT type) or some other form of display (e.g. LCD display) for displaying graphics. FIG. 2 illustates a presentation of a horizontal view, a plan view, of the space area around one's own position, which corresponds to the projection surface 3 in FIG. 1. In the presentation in FIG. 2, the shown circular curves 5 and 6 represent angles. The circular curve 6 shows the height (on the projection surface) of the objects that are at the same height as the reference position 1, i.e. in this case one's own height, while the circular curve shows the maximum angle of altitude for which a target direction can be given from one's own position. One's own position cannot be shown in the projection, since the projection surface 3 represents the aforementioned envelope surface of a cone. Here you have to imagine one's own plane positioned vertically on the axis 2 at the same height as the circular curve 6. In the drawing, the distance m denotes the maximum angle of altitude that can be shown on the display surface I using the selected projection surface. In the drawing, the target A is shown having bearing 140° to the right, with the angle of altitude α corresponding to the distance a above the circular curve 6 for the projection A1 of target A. In the same way, target B is illustrated having bearing 120° to the left, with the angle of altitude β corresponding to the distance b above the circular curve 6 for the projection B1 of target B. The sensor area 7 extends from bearing $c_1$ to bearing $c_2$ to the right, and from angle of altitude γ to angle of altitude δ, in this example showing positive angles of elevation.

Figure 4:
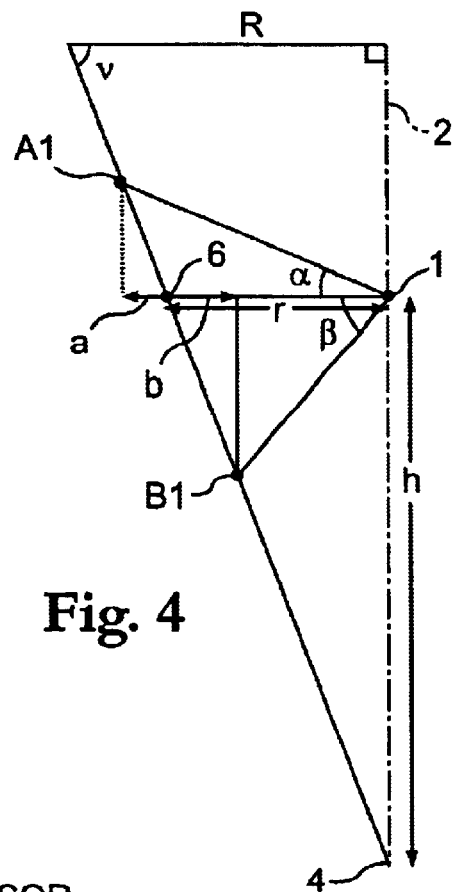
FIG. 4 shows in a section through the projection surface the angles that are the basis for calculating the projection of recorded objects on the projection surface.

Determination of the position of targets projected on the projection surface can be performed based on the angles and distances that are shown in FIG. 4, where a vertical section through the projection surface 3 shows that the line of section through the envelope surface is a straight line. The line of section through the envelope surface could equally well be a bent curve in the case where the envelope surface is double curved, i.e. the cone juts inwards or outwards. In the case shown, the angle of altitude ν of the cone determines the slope of the projection surface. The largest radius of the cone is denoted by R, the height of one's own position by h, and the radius in the horizontal plane for one's own position by r. This data is known, since the dimensions of the cone are predetermined and one's own altitude h can be read from instruments. The angle of altitude to target A is α. It can then be shown that the distance a, which corresponds to the distance horizontally outwards from the curve 6 that is the projection of one's own height on the cone, can be calculated as $$a = \frac{r^2 \tan \alpha}{h - r \tan \alpha}$$

The distance a is governed by the angle of altitude α and, thus, can be considered a measure of the size of the said angle when shown on the display surface I.

Similarly, the distance b represents the distance horizontally inwards from the curve 6, where b may be calculated as $$b = \frac{r^2 \tan \beta}{h + r \tan \beta}$$

and r=h/tan ν

Figure 5:
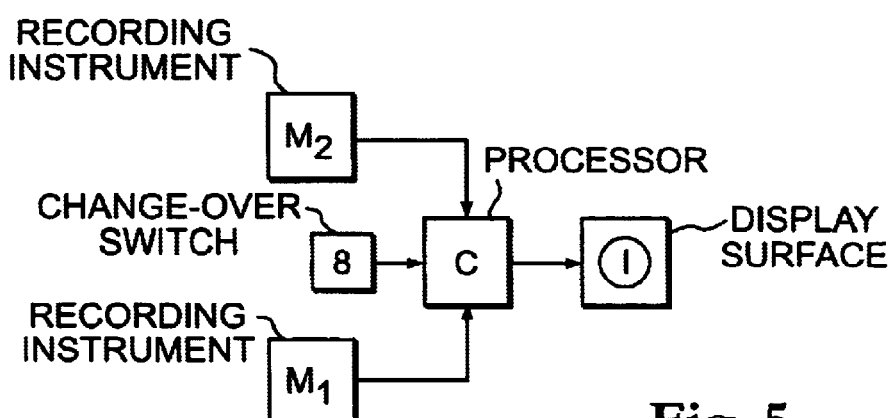
FIG. 5 shows how the display surface is linked to recording instruments and a processor for calculating.

FIG. 5 shows a couple of an arbitrary number of recording instruments M1, M2 for collecting data on angles of elevation and bearings to surrounding objects A, B. This data is sent to a processor C, which receives information on the values of the required projection surface via a change-over switch 8. The processor C can then be supplied with pre-selected values for the desired total height of the projection surface, and its angle of altitude ν, as well as for the position of the apex of the projection above the ground surface. The cone-shaped projection surface 3 may be turned so that its apex faces either upwards or downwards. It is assumed here that the apex 4 is facing downwards, while the claims in this particular application are designed to cover both alternatives. In the case where the projection surface mentioned above is fixed to the aircraft, one's own height has, in this case, a predetermined value and has no significance as regards to height above ground level.

Graphic representation of the direction to the object allows the distance to the each of the objects A, B to be measured. These distances can be represented on the display surface, in the form of a viewing screen or display, by letting each object be symbolized graphically in a way that is dependent on the distance to the object. This can be achieved by representing the different distances by, for example, different colors, different graphic symbols, varying sizes of the picture elements, alphanumeric characters or a combination of these graphic representations. Therefore, in the case where action is required of an operator, measures can be employed according to the proximity of the object.

The display surface I can be embodied, as mentioned above, by a viewing screen in the form of an ordinary television-picture tube, LCD displays, or be shown by means of VRD techniques (so called Virtual Retinal Display).

Figure 6:
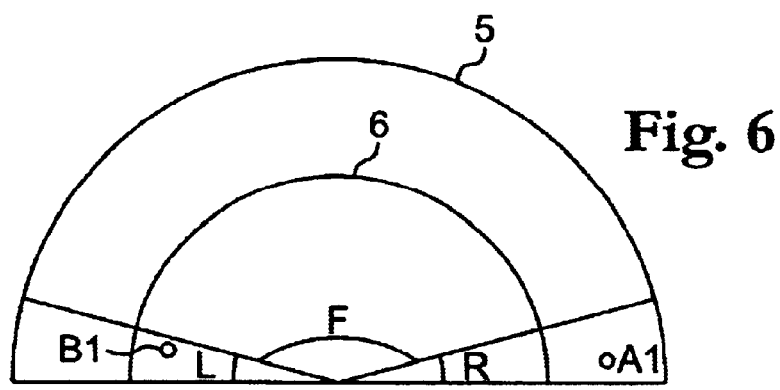
FIG. 6 shows a display surface with only sectors of the surroundings reproduced.
Figure 3:
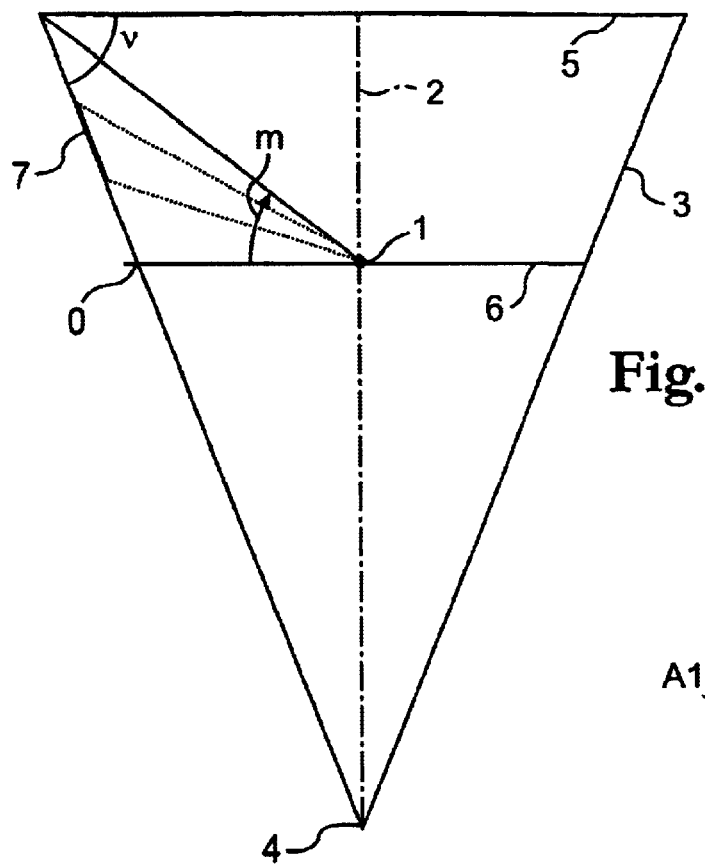
FIG. 3 shows in a sectional view the projection surface that is used in accordance with the aspect of the invention.

In many situations, one's main interest may be to study the surroundings and obtain directional information for objects that are within a specific sector, for example within the sector in front, i.e. between bearing 90° left and 90° right, here termed the forward sector. In such a case, it is advantageous to show only a part of the forward sector on the display surface, where advisably only a semicircle is shown. Thus, as shown in FIG. 6, a 160-degree section of the forward sector can be displayed to scale. The sector F indicted in FIG. 6 represents the 160-degree forward direction, while display of targets present between bearing 80 and 180 right is shown compressed in sector R, at the same time as targets present between bearing 80 and 180 left are shown compressed in sector L. In these sectors, R and L, the degree scale is compressed. The intention is, nevertheless, to be able to indicate targets in other directions even if one's attention is directed in a forward direction by having greater resolution in this sector. Other sectors than the ones proposed here can naturally be selected.

Measurements for the angles to the objects A, B can be obtained from other measuring means than those mentioned above. Thus, the data in the current example, where the reference position is held by an aircraft, can be obtained via links from, for example, the action information center, some other flight information center or other external-measuring device. In these cases, the angle values to the objects are obtained by converting externally received data by processing in a processor. It follows that at least one of the instruments M1, M2 in FIG. 5 can symbolize such an external measuring device, which means, in this example, that processor C converts the obtained measurement data to angle values for the objects A, B relative to one's own position.

What is claimed is:

1. A method for showing, on a display surface and from a reference position, the direction to surrounding objects in space, wherein the angle of altitude and the bearing to the objects are measured, a projection surface in the form of an envelope surface of a solid of revolution having a vertical axis of rotation and a cross-sectional area which increases along the axis of rotation is defined in space, where the reference position is located on the axis of rotation, the horizontal plane through the reference position intersects the projection surface to form a circular curve, a line of collimation from the reference position to an object intersects the projection surface at a point, on the display surface, the projection surface is shown in a plan view across its axis of rotation, a reference direction is defined on the circular curve representing the horizontal plane, the direction to the object in space relative to the reference position is given by an image of the position of the points on the display surface, where the bearing of the points from the reference direction gives the bearing to the object, and where the angle of altitude of the object relative to the reference position is represented by the distance from the points to the horizontal circular curve with a positive or negative angle of altitude, depending on whether the point falls outside or inside the horizontal circular curve.

2. The method according to claim 1, wherein the reference position is movable along the axis of rotation of the projection surface.

3. The method according to claim 1, wherein the reference position is fixed to a certain point on the axis of rotation of the projection surface.

4. The method according to claim 2, wherein the apex of the projection surface follows the ground surface level.

5. The method according to claim 1, wherein measurement of angles of altitude and azimuths to the objects is performed by radar, IR sensor or interception receiver.

6. The method according to claim 1, wherein measurement of at least one of either the angle of altitude or the azimuth to an object is performed by a measurement device in a position other than at the reference position, and that a processor converts the said angle so that they are related to the reference position.

7. The method according to claim 1, wherein the reference position is occupied by a flying craft, and that at least one of either the angle of altitude or the azimuth to an object is received in the flying craft via a link from a measuring device in another position, and that a processor converts the said angle to values that are related to the flying craft.

8. The method according to claim 1, wherein the distance to each object is measured by distance meters, whereby the respective points corresponding to an object are symbolized on the display surface by a graphic symbol.

9. The method according to claim 1, wherein on the plan view of the projection surface on the display surface, only a part of the whole circle is shown.

10. The method according to claim 9, wherein only a part of the whole circle is shown by showing at least one sector of arbitrary angle about the reference position.

11. The method according to claim 1, wherein the bearing for each object is displayed on the display surface as the bearing to the point corresponding to the respective object.

12. A device for showing, from a reference position, the direction to surrounding objects in space, the device comprising:

instruments for measuring the angle of altitude and bearing to the respective objects, a processor which is supplied with the said angle values and in which data is stored for a virtual projection surface in space, where the projection surface is embodied by a surface of revolution having a vertical axis of rotation, and the cross-sectional area of the surface of revolution increases along the axis of rotation, with the reference position located on the axis of rotation, and where the processor calculates both the position of the point of intersection where a line of collimation from the reference position to the respective object intersects the projection surface, as well as the position of a circular curve which represents the intersection between the horizontal plane through the reference position and the projection surface, a display surface that shows, in a plan view across the axis of rotation,
  a) the projection surface in the form of a largest circular curve, which represents the limiting curve of the greatest cross-section of the projection surface,
  b) a horizontal circular curve, which represents the horizontal plane through the reference position and
  c) objects represented by the points.

13. The device according to claim 10, wherein the processor calculates the distance between the horizontal circular curve and the respective image points, where the distance is a function of the measured angle of altitude to the respective objects represented by the image points.

14. The device according to claim 10, wherein the display surface is embodied by a television-picture tube, a LCD display, or a VRD image.

15. The method according to claim 7, wherein the at least one of the angle of altitude or the azimuth to an object is received from a flight information center or an action information center.

16. The method according to claim 8, wherein the graphic symbol includes the point adopting different colors according to distance, the point changing size according to distance, the point being denoted by alphanumeric characters containing information regarding distance, or the point being indicated by a graphic symbol together with an alphanumeric character.

17. The method according to claim 10, wherein the degree graduation of the shown sector is displayed in a scale of one's choice.

* * * * *